Nov. 5, 1940.                E. MILLARD ET AL                    2,220,772
                       FILTER AND TRAP FOR PLUMBING FIXTURES
                              Filed Jan. 25, 1939
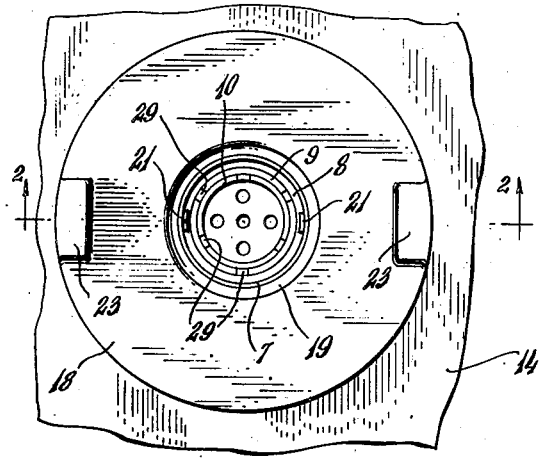
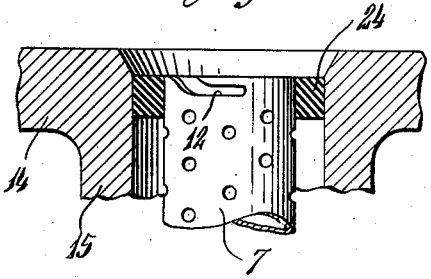
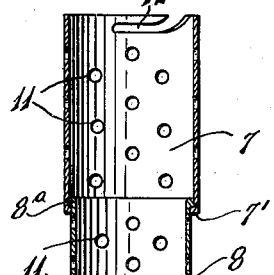
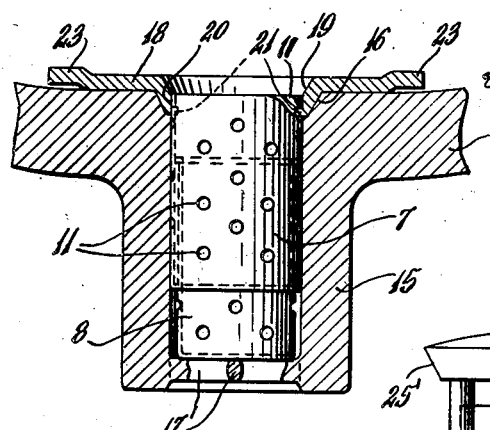
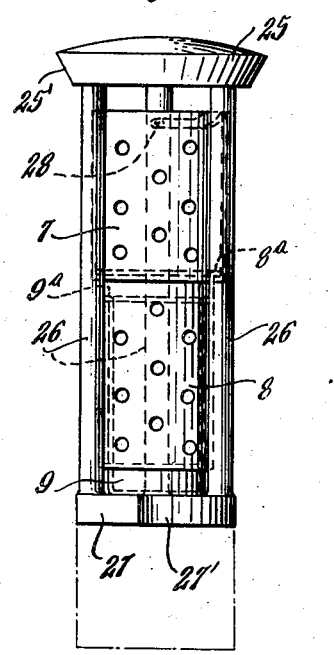
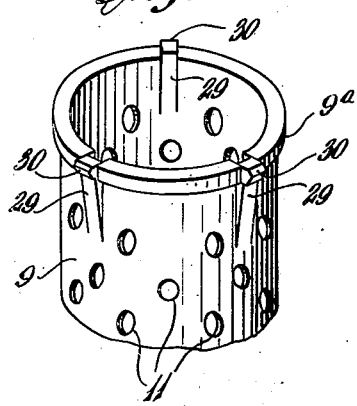
Ethel Millard
Evelyn Ray
Harriett W. Wetmore
INVENTORS
BY *John O. Seifert*
ATTORNEY Patented Nov. 5, 1940

2,220,772

UNITED STATES PATENT OFFICE 2,220,772

FILTER AND TRAP FOR PLUMBING FIXTURES

Ethel Millard, Harriett W. Wetmore, and Evelyn Ray, New York, N. Y.

Application January 25, 1939, Serial No. 252,760

3 Claims. (Cl. 4—291)

This invention relates to a filter to be interposed between the drain outlet of plumbing fixtures such as sinks, water bowls, bath tubs, laundry trays and the like, and drain pipes to separate foreign substances from liquid, such as water, passing through the drain outlet into the drain pipe and trap the same therein together with articles that may be accidentally dropped and passed through the drain outlet, and thus not only preventing clogging of the drain pipe by such foreign substances but also preventing articles passing through the drain outlet into and through the drain pipe and loss of the same.

We are aware of devices for this purpose but in all instances they are adapted only for use with a particular drain outlet, that is, a device that may be used in connection with the drain outlet of a sink is incapable of use in connection with the drain outlet of a wash bowl, or outlets of bath and laundry tubs, or for use with closure plugs for such outlets.

It is the object of the invention to provide an improved filter and trap of this character that is adjustable and adaptable to be interchanged and used in connection with drain outlets of different sizes as well as for use with closures for said outlets of different diameter and length.

In the drawing accompanying and forming a part of this application,

Figure 1 is a side elevation, partly in section, of the filter and trap.

Figure 2 is a side elevation of the filter and trap and showing in section means to suspend the same relative to the drain outlet of a sink.

Figure 3 is a plan view of the means shown in Figure 2 for suspending the filter and trap in the drain outlet of a sink.

Figure 4 is a sectional view showing the means for adapting the filter and trap to be suspended in the drain outlet of a sink of larger diameter than the filter and trap.

Figure 5 is a side elevation of a form of closure plug for the drain outlet of a wash bowl and the like showing the manner of adapting the filter and trap thereto.

Figure 6 is a perspective view of the upper portion or section of the filter and trap showing the same arranged with detents to co-operate with the member of the filter engaged thereon to support the same.

In carrying out the embodiment of the invention shown in the drawing the filter and trap comprise a series of telescoping members or sections, shown as four in number, 7, 8, 9 and 10, although a greater or less number of such members may be utilized. Each of said members consists of a tubular body having perforations 11 therein and may be constructed from a tube or sheet of metal shaped to tubular form. The member at one end, as 7, is provided with angular slots 12 with one angle portion cut through the end of the member and the other angle portion extending circumferentially of the same, and in effect constituting a bayonet slot. The outer end of the other member 10 is provided with an obstruction, as at 13, which may be effected by flanging the material of the body inwardly, or it may consist of a perforated disk secured in the end of said member. Each of the members 7, 8 and 9 at the end slidably engaged upon the succeeding member is arranged with inwardly extending means, shown as a flange extended inwardly from the end of each member, as at 7', 8' and 9', and each of the members 8, 9 and 10 at the end engaging in the preceding member is arranged with outwardly extending means, shown as a flange extended outwardly from the end of each member, as at 8a, 9a and 10a, adapted to engage the flanges 7', 8' and 9' to suspend the members from the next preceding member.

To adapt the filter and trap for use with a sink 14, which, as shown in Figure 2, is arranged with a drain outlet in a tubular member 15 projecting downwardly from the bottom of the sink, the opening therein having a beveled seat 16 at the entrance thereof for the engagement of a stopper or closure plug. The opening or bore in the portion 15 is provided with members 17 extending transversely of the opening and at a right angle to each other forming an obstruction to prevent the passage of articles therethrough greater than the spaces between the members 17, the parts also functioning to collect thereon foreign substances separated from water passing through the opening from the sink. To remove an article or material collected on said member 17 it is necessary to extend the finger or an implement into the opening to engage and lift the article or other substances from the member 17.

To adapt the filter and trap of the present application to such form of drain outlet there is provided a plate 18 having a central opening with a flange 19 disposed about the opening and converging from a side of the plate at the same angle as and adapted to engage with the seat 16 of the drain outlet of the sink. The wall about the opening is also beveled to form a seat for a closure. A portion of the wall of the opening through the flange portion 19 is arranged to extend parallelly of the axis of the opening and is of a diameter substantially equal to the outer diameter of the member 7 of the filter, as at 20. The filter and trap is suspended or supported from the flange 19 by projections extended inwardly at the end of the flange engaging the recesses in the member 7 at the inlet, as shown at 21. To apply the filter and trap to a drain outlet of this character it is connected to the plate 18 and inserted into the opening. As the end member 10 of the filter engages the members 17 downward pressure is applied to the plate causing the lower members of the filter to telescope into the upper members, as shown. To clean the filter it is removed with the plate 18 and to facilitate removing of the filter the plate is provided with diametrically opposite finger grips formed by pressing peripheral portions of the plate outwardly, as at 23.

The filter is adapted to be utilized with drain openings of this character having a diameter substantially the same as that of the filter member 7 of greatest diameter, or with drain openings of greater diameter, in which case an annular member preferably of resilient material, such as rubber, having an outside diameter equal to the diameter of the drain opening is engaged upon the upper member 7, as shown at 24 in Figure 4, and then engaged in the drain outlet, the member 24 centering the filter and trap in the opening and causing the water to flow into and through the filter.

The filter and trap is also adapted to be carried by the conventional form of drain outlet closure, as shown in Figure 5, including a closure plug member 25 having a lower beveled edge 25' to engage a corresponding seat at the entrance to the drain outlet. Posts 26, shown as three in number, are connected to or integral with and equidistantly spaced about the plug member 25 and extend from the bottom thereof, the posts being connected at the opposite ends by an annular member 27 adapted for the engagement of an actuating member to actuate the plug to position to provide a passage between the plug and entrance to the drain outlet, and has a recess 27 therein for the passage of the actuating member to permit the closure to assume drain outlet closing position by gravity. Closures of this character are made of different lengths and different diameters. In closures wherein the space between the posts is substantially equal to the diameter of the filter member 7 of greatest diameter the filter and trap is passed through the annular member 27 between the posts 26 and the slots 12 engaged with a pin or pins extending inwardly from a post or posts 26 to suspend or support the filter within said posts, as shown at 28. The length of the closure member is slightly greater than the combined length of the two upper filter members 7 and 8 and to cause the filter to be confined within the posts the filter member 10 is adjusted to engage within the filter member 9 and the latter adjusted to engage within the member 8. To retain filter members 9, 10 in adjusted positions said members are provided with yielding detents at their upper ends adapted to engage the upper ends of the filter members 8 or 9 or in a perforation or perforations in said members. As shown, the detents are arranged on the members 9, 10 by separating, as by stamping or otherwise portions from and spaced about the upper end of said members and arranging said portions to extend outwardly therefrom, as shown at 29 in Figure 6. The upper ends of said detents separated from the outwardly extending flange portion due to said flange portion are provided with a laterally projecting nose, and to facilitate said projections moving into and out of perforations of the filter members and to ride off from the end of such a member by a longitudinal pressure applied to the filtering member, the outer end of said projections is beveled, as shown at 30. The detents are normally maintained within the contour of the members 9, 10 by engaging the wall of the preceding filter member. Should the length of the closure member 25 be substantially equal to the length of two of the filter members, the filter member 10 is moved into the member 9 until the projections 30 ride off from the inner surface of and onto the end of said member 9, when the member 9 is moved into member 8 until the projections 30 of the detents of said member 9 ride off from and onto the end of the member 8. Should the closure be of a length as indicated by dot and dash line in Figure 5, the member 10 is moved into the member 9 to be suspended from the upper end thereof, and the member 9 is moved into the member 8 a distance less than the length thereof and suspended from the member 8 by one or more of the detent projections 30 engaging a perforation or perforations in the member 8. Should the space within the posts 26 be of greater diameter than the diameter of the member 7 the filter is positioned centrally within the posts by engaging thereon an annular member, as shown in Figure 4.

Having described our invention, we claim:

1. A filter and trap for the drain outlet of plumbing fixtures, comprising a series of telescopible members each having perforations in the wall thereof, the member at one end being open at the outer end and arranged with slots opening through the end thereof and having a part extending circumferentially of said member adapted for the releasable engagement of means to support the filter, and the member at the opposite end arranged with an obstruction at the outer end, each member having an inwardly extending flange at the end engaging upon a successive member, and the end of the members engaging in a preceding member having an outwardly extending flange adapted to engage the inwardly extending flanges to limit the outward movement of the members and support a succeeding member from a preceding member.

2. A filter and trap as claimed in claim 1, wherein the end member with the obstruction at the outer end and the successive preceding member are arranged at the outwardly flanged end with laterally extending detents adapted to releasably engage and support said members from the end or perforations in the next preceding member.

3. In a filter or trap for the drain outlet of plumbing fixtures, a series of telescopible members each having perforations in the wall thereof, the member at one end having an obstruction at the outer end and the member at the opposite end arranged at the outer end with bayonet slots, and a plate having an opening with a flange disposed about the same adapted to be engaged in the drain outlet of a plumbing fixture, and projections extending inwardly from said flange adapted to engage the bayonet slots in the end member of the filter to support the filter suspended in the drain outlet.

ETHEL MILLARD.
EVELYN RAY.
HARRIETT W. WETMORE.